United States Patent
Hiasa

(10) Patent No.: US 12,183,055 B2
(45) Date of Patent: Dec. 31, 2024

(54) IMAGE PROCESSING METHOD AND APPARATUS, TRAINING METHOD AND APPARATUS OF MACHINE LEARNING MODEL, AND STORAGE MEDIUM

(71) Applicant: CANON KABUSHIKI KAISHA, Tokyo (JP)

(72) Inventor: Norihito Hiasa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 338 days.

(21) Appl. No.: 17/592,975

(22) Filed: Feb. 4, 2022

(65) Prior Publication Data
US 2022/0254139 A1    Aug. 11, 2022

(30) Foreign Application Priority Data

Feb. 9, 2021    (JP) ................................. 2021-018697

(51) Int. Cl.
*G06V 10/70* (2022.01)
*G06T 5/73* (2024.01)

(52) U.S. Cl.
CPC ............... *G06V 10/70* (2022.01); *G06T 5/73* (2024.01); *G06T 2207/20081* (2013.01)

(58) Field of Classification Search
CPC .. G06V 10/70; G06T 5/73; G06T 5/60; G06T 5/70; G06T 7/0002; G06T 2207/30168; G06T 2207/20081
See application file for complete search history.

(56) References Cited

U.S. PATENT DOCUMENTS

| | | | |
|---|---|---|---|
| 11,450,008 B1* | 9/2022 | Tyagi | G06N 3/0464 |
| 2014/0218550 A1* | 8/2014 | Chuang | H04N 23/80 |
| | | | 348/208.6 |
| 2014/0375849 A1 | 12/2014 | Komatsu | |
| 2015/0248775 A1* | 9/2015 | Freeman | G06T 7/194 |
| | | | 345/589 |
| 2017/0293999 A1 | 10/2017 | Tokui et al. | |
| 2021/0065454 A1* | 3/2021 | Goodrich | G06N 20/00 |
| 2021/0174477 A1* | 6/2021 | Shi | G06V 40/166 |

FOREIGN PATENT DOCUMENTS

EP    3614336 A1    2/2020

OTHER PUBLICATIONS

Li Xu "Deep Convolutional Neural Network for Image Deconvolution", Advances in Neural Information Processing Systems 27, NIPS2014, 2014: pp. 1-9. Cited in the specification.
Extended European search report issued in European Appln. No. 22155187.2 mailed on Jul. 27, 2022.
Cho "Handling outliers in non-blind image deconvolution" IEEE International Conference on Computer Vision. 2011: 495-502.
Chen "Learning a Non-blind Deblurring Network for Night Blurry Images" IEEE/CVF Conference on Computer Vision and Pattern Recognition (CVPR). 2021: pp. 10537-10545.

* cited by examiner

*Primary Examiner* — Congvan Tran
(74) *Attorney, Agent, or Firm* — ROSSI, KIMMS & McDOWELL LLP

(57) ABSTRACT

An image processing method includes a first step of acquiring a captured image, and a second step of generating a first map based on the captured image using a machine learning model. The first map is a map indicating a magnitude and range of a signal value in an area where an object in a luminance saturation area in the captured image is spread by a blur generated in an imaging step of the captured image.

12 Claims, 14 Drawing Sheets

IMAGE PROCESSING METHOD AND APPARATUS, TRAINING METHOD AND APPARATUS OF MACHINE LEARNING MODEL, AND STORAGE MEDIUM

BACKGROUND OF THE INVENTION

Field of the Invention

The present invention relates to an image processing method for performing a recognition or regression task using a machine learning model for a blurred image.

Description of the Related Art

Li Xu et al., Deep Convolutional Neural Network for Image Deconvolution, Advances in Neural Information Processing Systems 27, NIPS2014 ("Xu et al.") discloses a method for sharpening a blur in a captured image using a convolutional neural network (CNN) that is one of machine learning models. This method generates training dataset by blurring an image having a signal value equal to or higher than a luminance saturation value in the captured image, and suppresses adverse effects even around the luminance saturation area by training the CNN with the training dataset, thereby sharpening the blur.

However, the method disclosed in Xu et al. may cause an artifact (false structure) on an object at a position that is irrelevant to the luminance saturation. The artifact is specifically a local decrease or increase of a signal value that differs from the structure of the actual object. A detailed description will be given later of the artifact and how it is generated. The accuracy of a task for an image having a blur other than the blur sharpening is similarly deteriorated by the influence of the luminance saturation.

SUMMARY OF THE INVENTION

The present invention provides an image processing method that can suppress a decrease in accuracy caused by a luminance saturation of a recognition or regression task using machine learning for a blurred image.

An image processing method according to one aspect of the present invention includes a first step of acquiring a captured image, and a second step of generating a first map based on the captured image using a machine learning model. The first map is a map indicating a magnitude and range of a signal value in an area where an object in a luminance saturation area in the captured image is spread by a blur generated in an imaging step of the captured image. An image processing apparatus corresponding to the above image processing method also constitutes another aspect of the present invention.

A training method according to another aspect of the present invention of a machine learning model includes the steps of acquiring an original image, generating a blurred image by adding a blur to the original image, setting a first area using an image and a threshold of a signal value based on the original image, generating a first image having the signal value of the original image in the first area, generating a first ground truth map by adding the blur to the first image, and training a machine learning model using the blurred image and the first ground truth map. A training apparatus corresponding to the training method also constitutes another aspect of the present invention.

Further features of the present invention will become apparent from the following description of exemplary embodiments with reference to the attached drawings.

DESCRIPTION OF THE EMBODIMENTS

Figure 1:
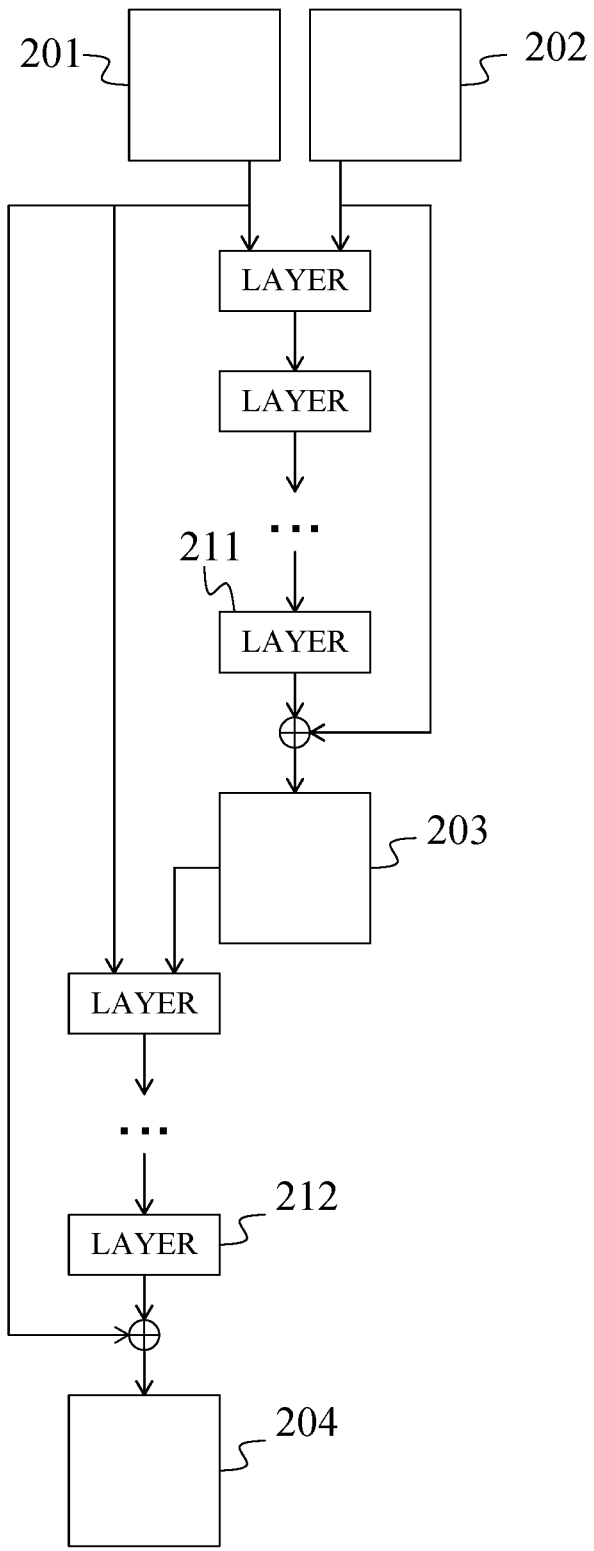
FIG. 1 is a configuration diagram of a machine learning model according to a first embodiment.

Referring now to the accompanying drawings, a detailed description will be given of embodiments according to the present invention. Corresponding elements in respective figures will be designated by the same reference numerals, and a duplicate description thereof will be omitted.

Prior to detailing each embodiment, a problem to be solved by the present invention will be described. In a recognition or regression task for an image, theory-based methods may deteriorate the accuracy due to (modeled) elements that are ignored by an assumption and an approximation. On the other hand, the method using the machine learning model improves the accuracy of the task by training the machine learning model using the training data including those elements because the estimation can be realized according to the training data without assumptions and approximations. That is, the method using the machine learning model is more accurate than the theory-based method in the recognition or regression task for the image.

For example, the technology for sharpening blurs in the blurred captured image causes a luminance saturation (also called overexposure) of the captured image as the above element. The theory-based method such as the Wiener filter assumes no luminance saturation, thus cannot properly sharpen blurs around the luminance saturation area, and causes adverse effects such as ringing. On the other hand, the method using machine learning disclosed in Xu et al. can correct the blur even with the luminance saturation. However, the method disclosed in Xu et al. may be sometimes less accurate due to the artifact contained in the corrected image.

The problem to be solved by the present invention is the accuracy deteriorated by the luminance saturation in the recognition or regression task using the machine learning model applied to a blurred captured image. The blur includes one or a combination of some or all of a blur caused by the aberration, diffraction, or defocus of the optical system for capturing the captured image, a blur caused by the optical low-pass filter, a blur caused by a pixel aperture in an image sensor, a blur caused by a camera shake or an object shake during imaging, and the like. The recognition task is a task for finding a class corresponding to the input image. For example, the recognition task is a task for recognizing a nature or meaning of an object, such as a task of classifying an object in an image into a person, a dog, an automobile, etc., and a task of classifying a facial image into various facial expressions such as smiling and crying. The class has generally a discrete variable. The class also has a recognition label as a scalar value, or a signal sequence in which recognition labels are spatially arranged like a segmentation map. The regression task is a task for finding a signal sequence in which continuous variables corresponding to an input image are spatially arranged. For example, the regression task is a task of estimating an image having a sharpened blur from a blurred image, a task of estimating a depth map of an object space from an image, or the like.

Figure 2A:
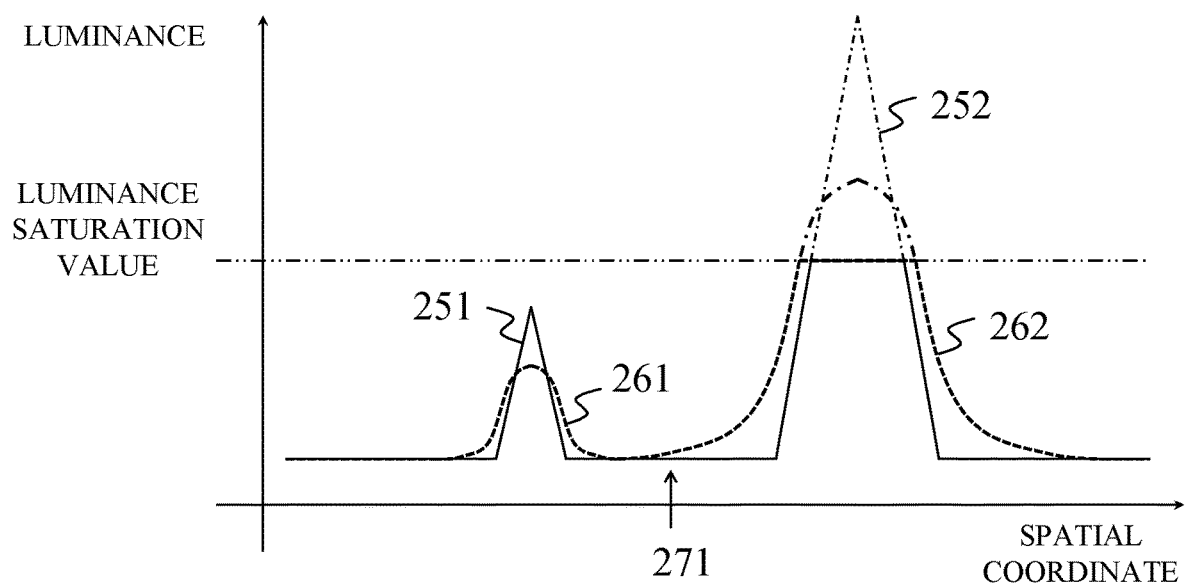
FIGS. 2A and 2B are explanatory diagrams illustrating a relationship between an object and a captured image according to first to third embodiments, and a first map.

Referring now to FIG. 2A, a description will be given of a difference in nature between the periphery of luminance saturation and another area in the blurred captured image. FIG. 2A illustrates a luminance distribution relationship between the object and the captured image. In FIG. 2A, a horizontal axis represents a spatial coordinate and a vertical axis represents a luminance. A solid line denotes a non-blurred captured image, and a broken line denotes an actual, blurred captured image. An alternate long and short dash line denotes a luminance distribution before it is clipped by the luminance saturation. An object 251 even if blurred during the imaging process, has a luminance equal to or less than the luminance saturation value. Therefore, no clip by the luminance saturation value does occur, and an unsaturated blurred image 261 is obtained. On the other hand, an object 252 has a luminance equal to or higher than the luminance saturation value as a result of blurring in the imaging process, and thus is clipped by the luminance saturation value, resulting in a saturated blurred image 262. In the unsaturated blurred image 261, information of the object is attenuated by the blur. On the other hand, in the saturated blurred image 262, information of the object is attenuated not only by the blur but also by the signal value clip by the luminance saturation. Therefore, the way of attenuating the object information differs depending on the luminance saturation. This is the first factor in which the nature differs between the periphery of the luminance saturation and another area.

Next follows a description of a second factor that causes the different nature. That is, the signal value clip causes a false edge that does not originally exist in the object at the edge of the luminance saturation area. The saturated blurred image 262 originally has a smooth luminance distribution represented by an alternate long and short dash line above the luminance saturation value, but a discontinuous edge is formed by the clip of the luminance saturation value.

Moreover, in the captured image, a signal value leaks out of the object 252 in the luminance saturation area to its periphery due to blurring. The magnitude and range of the leak signal value increase as the luminance of the object 252 in the luminance saturation area increases, but due to the signal value clip by the luminance saturation, the magnitude and range of the leak signal value are hardly known. Therefore, a third factor that causes the different nature is that the signal value of the object and the signal value leaked by the blur cannot be separated (even if the blur shape is known) around the luminance saturation area.

Because the nature is different between the periphery of the luminance saturation area and another area due to these three factors, a highly accurate task cannot be realized unless different processing is executed for each of them.

The machine learning model can execute processing having different effects according to the characteristics of the input image, instead of processing having uniform effects on the input image. Therefore, for example, in an example of sharpening the blur in the captured image, the machine learning model internally determines whether a target area is a blurred image containing the luminance saturation (saturated blurred image) or another blurred image (unsaturated blurred image), and executes a different sharpening processing. Thereby, both blurred images can be sharpened. However, the determination of the machine learning model may be incorrect. For example, when the target area is located around the luminance saturation area the saturated blurred image 262 in FIG. 2A, the machine learning model can determine that the target area is an area affected by the luminance saturation because the luminance saturation area is located near the target area. When a position 271 distant from the luminance saturation area is a target area, however, it is not easy to determine whether or not the position 271 is affected by the luminance saturation, and the ambiguity increases. As a result, the machine learning model may make an erroneous determination (a misidentification) at a position distant from the luminance saturation area. Thereby, a task of sharpening the blur executes sharpening processing specialized for the saturated blurred image to the unsaturated blurred image. Then, an artifact occurs in the image with sharpened blur, and the accuracy of the task deteriorates. This artifact will be described in detail in the first embodiment.

This discussion is applicable to a task other than blur sharpening, and the accuracy of the task is deteriorated by the misjudgment by the machine learning model between an area affected by luminance saturation and another area. For example, in the recognition task, if the unsaturated blurred image is erroneously determined (misidentified) as a saturated blurred image, it is determined that the signal value leaked out of the luminance saturated area is added to the blurred image, so that a feature amount different from that of the actual unsaturated image is extracted, and the accuracy of the task deteriorates.

Next follows a description of a gist of this embodiment that solves this problem. This embodiment uses the machine learning model to generate a first map from a blurred captured image. The first map is a map (spatially arranged signal sequence) representing the magnitude and range of the signal values in the area where the object in the luminance saturation area in the captured image is spread by the blur generated in the imaging process of the captured image. In other words, the first map is a map representing a spread of the luminance value in the high luminance area including the luminance saturated area in the captured image (or a map representing a distribution in which a high luminance object that causes the luminance saturation is spread by the blur generated in the imaging process).

Figure 2B:
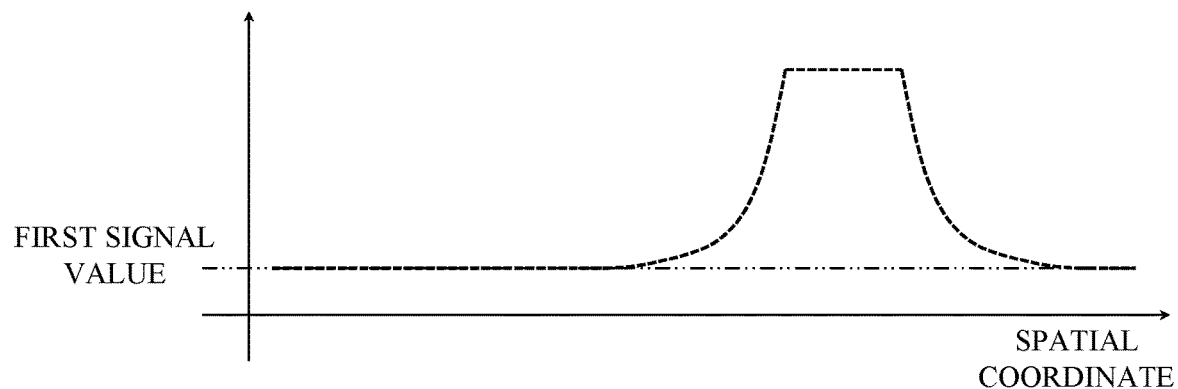

One example of a first map for the captured image in FIG. 2A is illustrated by a broken line in FIG. 2B. By instructing the machine learning model to explicitly generate the first map, the machine learning model can estimate the presence or absence of the influence of luminance saturation in the captured image and its magnitude with high accuracy. By generating the first map, the machine learning model can properly execute processing specialized for the area affected by the luminance saturation and processing specialized for another area to an arbitrary area. Therefore, by instructing the machine learning model to generate the first map, the accuracy of the task is improved more than that where no first map is generated (where the recognition label and the sharpened image are generated directly from the captured image).

In the following description, a stage of determining the weight of the machine learning model based on a training dataset will be called training, and a stage of executing the recognition or regression task for the captured image using the machine learning model with the trained weight will be called an estimation. The machine learning model includes, for example, a neural network, genetic programming, a Bayesian network, and the like. The neural network includes a CNN (Convolutional Neural Network), a GAN (Generative Adversarial Network), a RNN (Recurrent Neural Network), and the like.

First Embodiment

A description will now be given of an image processing system according to a first embodiment of the present invention. As a task by the machine learning model, this embodiment discusses sharpening the blur in the captured image including the luminance saturation. The blur to be sharpened includes a blur caused by the aberration and the diffraction generated in an optical system and a blur caused by an optical low-pass filter. The effect of the embodiment can also be obtained in sharpening the blur caused by the pixel aperture, the defocus, and the shake. This embodiment is also applicable to and obtains the effect in a task other than sharpening the blur.

Figure 3:
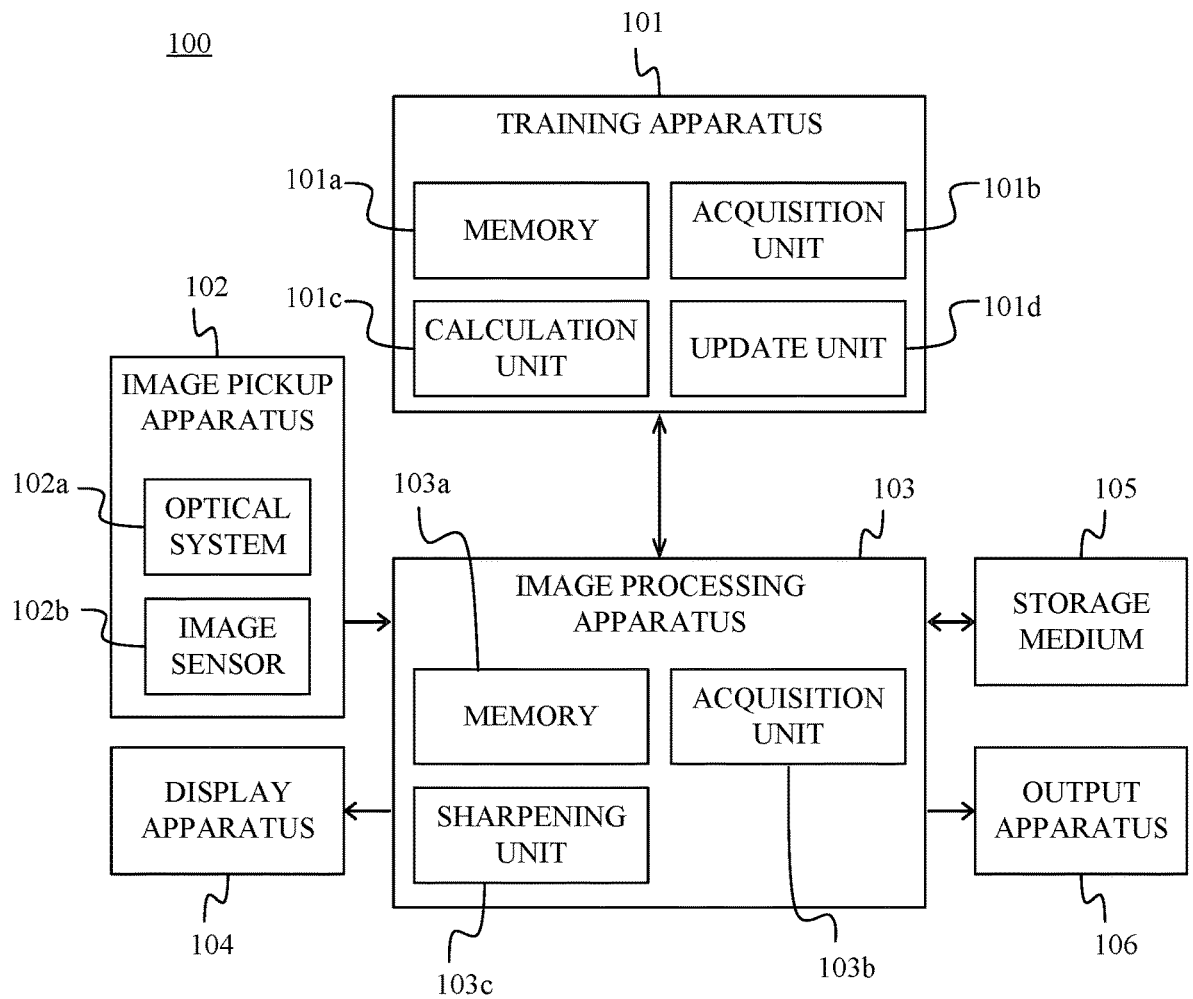
FIG. 3 is a block diagram of an image processing system according to the first embodiment.
Figure 4:
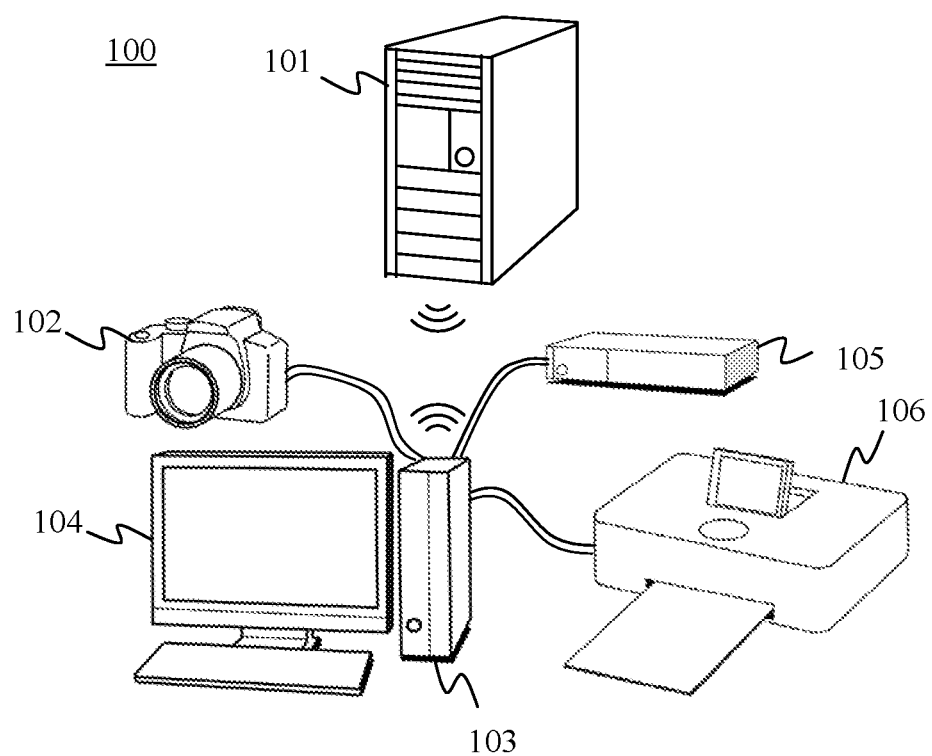
FIG. 4 is an external view of an image processing system according to the first embodiment.

FIG. 3 is a block diagram of an image processing system 100 according to this embodiment. FIG. 4 is an external view of the image processing system 100. The image processing system 100 includes a training apparatus 101 and an image processing apparatus 103 connected to each other by a wired or wireless network. The training apparatus 101 includes a memory 101a, an acquisition unit 101b, a calculation unit 101c, and an update unit 101d. The image processing apparatus 103 includes a memory 103a, an acquisition unit 103b, and a sharpening unit 103c. The image processing apparatus 102, a display apparatus 104, a recording medium 105, and an output apparatus 106 are connected to the image processing apparatus 103 by wire or wirelessly.

The captured image obtained by capturing the object space using the image pickup apparatus 102 is input to the image processing apparatus 103. The captured image is blurred due to the aberration and diffraction of the optical system 102a in the image pickup apparatus 102 and the optical low-pass filter in an image sensor 102b, and the information of the object is attenuated. The image processing apparatus 103 sharpens the blurs in the captured image using the machine learning model, and generates a first map and a blur-sharpened (or deblurred) image (model output). The machine learning model is trained by the training apparatus 101. The image processing apparatus 103 acquires information on the machine learning model from the training apparatus 101 in advance and stores it in the memory 103a. The image processing apparatus 103 serves to adjust the blur-sharpening intensity. A detailed description will be given later of training and an estimation of the machine learning model, and adjusting the blur-sharpening intensity.

The user can adjust the blur-sharpening intensity while checking the image displayed on the display apparatus 104. The blur-sharpened image to which the intensity has been adjusted is stored in the memory 103a or the recording medium 105, and is output to an output apparatus 106 such as a printer as needed. The captured image may be grayscale or may have a plurality of color components. An undeveloped RAW image or a developed image may be used.

Figure 5A:
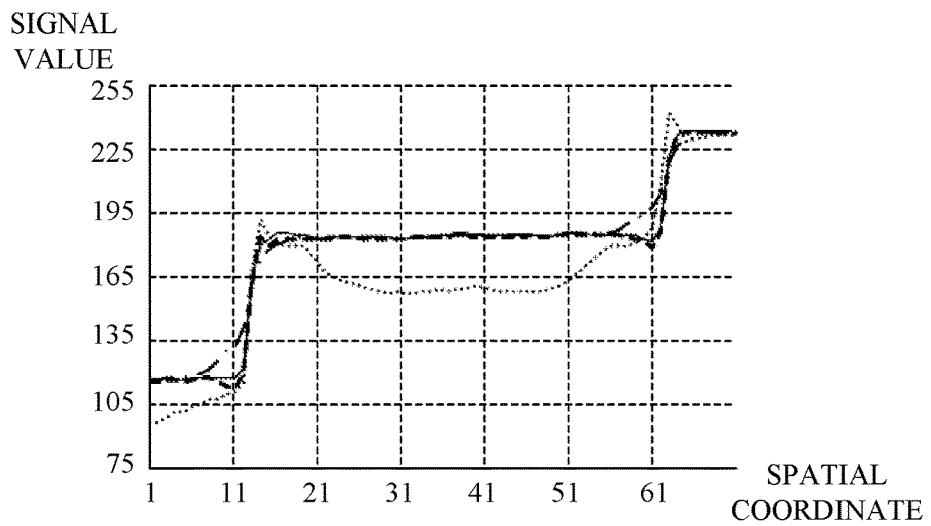
FIGS. 5A to 5C are explanatory diagrams of an artifact in the first embodiment.
Figure 5B:
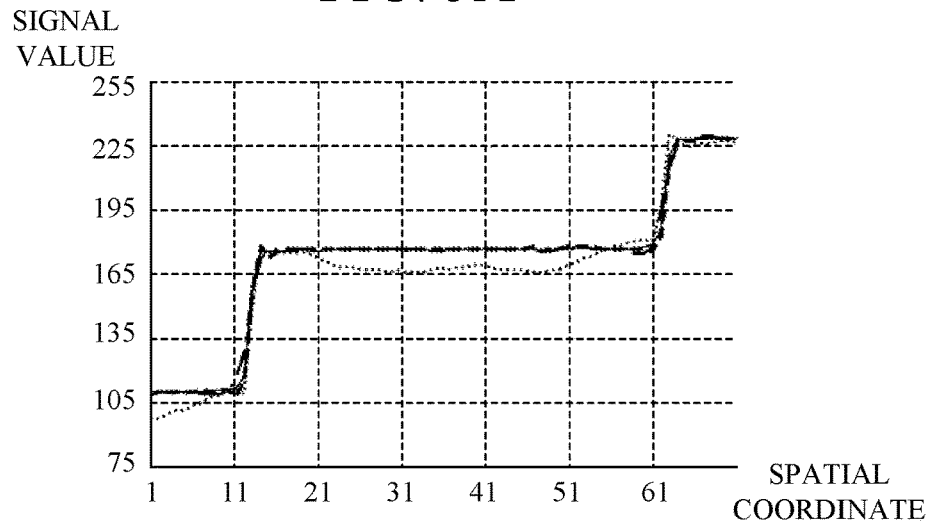
Figure 5C:
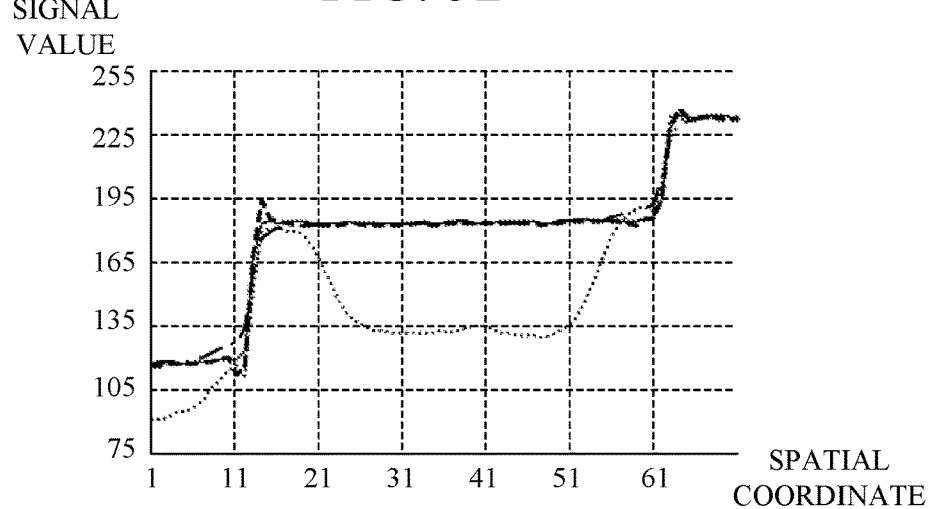

Referring now to FIGS. 5A to 5C, a description will be given of an artifact that occurs when the blur is sharpened by the machine learning model. The artifact is a local decrease or increase of a signal value that differs from the structure of the actual object. FIGS. 5A to 5C are explanatory diagrams of the artifact, where a horizontal axis represents a spatial coordinate and a vertical axis represents a signal value. FIGS. 5A to 5C illustrate spatial changes of signal values of the image, and correspond to the color components of R, G, and B (Red, Green, Blue), respectively. Since the image is an image developed to 8 bits, the saturation value is 255.

In FIGS. 5A to 5C, an alternate long and short dash line denotes the captured image (blurred image), and a thin solid line denotes a nonblurred ground truth image. Since none of the pixels have reached the luminance saturation value, there is no effect of the luminance saturation. A dotted line denotes a blur-sharpened image in which the blurred image is sharpened by the conventional machine learning model to which this embodiment is not applied. In the blur-sharpened image represented by the dotted line, the edge blur is sharpened, but a decrease of the signal value that does not appear in the ground truth image occurs near the center. This decrease is not adjacent to the edge, but occurs at a position distant from the edge, and since the generation area is wide, it is a harmful effect different from the undershoot. This is the artifact that occurs when the blur is sharpened.

As understood from the comparison among FIGS. 5A to 5C, the degree of decrease of the signal value differs depending on the color component. In FIG. 5A to 5C, the degree of decrease of the signal value increases in the order of G, R, and B. This tendency is similar in the undeveloped RAW image. The flat part in the ground truth image is illustrated as the artifact in a dark area colored in green in the conventional blur-sharpened image represented by the dotted line. Although FIGS. 5A to 5C illustrate an example in which the signal values are lower than those of the ground truth image, the signal values may be higher.

As mentioned above, this artifact is generated by the misjudgment of the machine learning model between the area affected by the luminance saturation and the other area and an erroneous application to the unsaturated blurred image of blur sharpening specialized for the saturated blurred image. As understood from FIG. 2A, the higher the luminance of the object has, the larger the absolute value of the residual component of the blur sharpening becomes (which is a difference between a blurred captured image and a nonblurred captured image). If the blur sharpening specialized for the saturated blurred image is applied to the unsaturated blurred image, the signal value changes excessively. As a result, the areas where the signal values are lower than those of the ground truth image (solid line) are generated as illustrated by the dotted lines in FIGS. 5A to 5C.

In general, optical systems for visible light are often designed to have the best G performance among RGB. Since a blur spread (PSF: point spread function) is wider in R and B than in G, the edge of the saturated blurred image obtained by capturing a high-intensity object is easily colored in R and B (purple fringes). In correcting the saturated blurred image, the residual component of the blur sharpening in R and B becomes larger than in G. When an unsaturated blurred image is erroneously determined as a saturated blurred image, the decreases of the signal values of R and B are larger than the decrease of the signal value of G, and as illustrated in FIGS. 5A to 5C, artifacts occur as dark areas colored in green.

On the other hand, broken lines illustrated in FIGS. 5A to 5C are results of sharpening the blurs using the machine learning model that estimates the first map according to this embodiment. It is understood that the blur is sharpened by suppressing the artifacts. This is because the machine learning model that has been instructed to explicitly estimate the first map is less likely to erroneously determine the area affected by the luminance saturation and the other area. From FIGS. 5A to 5C, it is understood that this embodiment suppresses the deterioration of the accuracy of the task.

Figure 6:
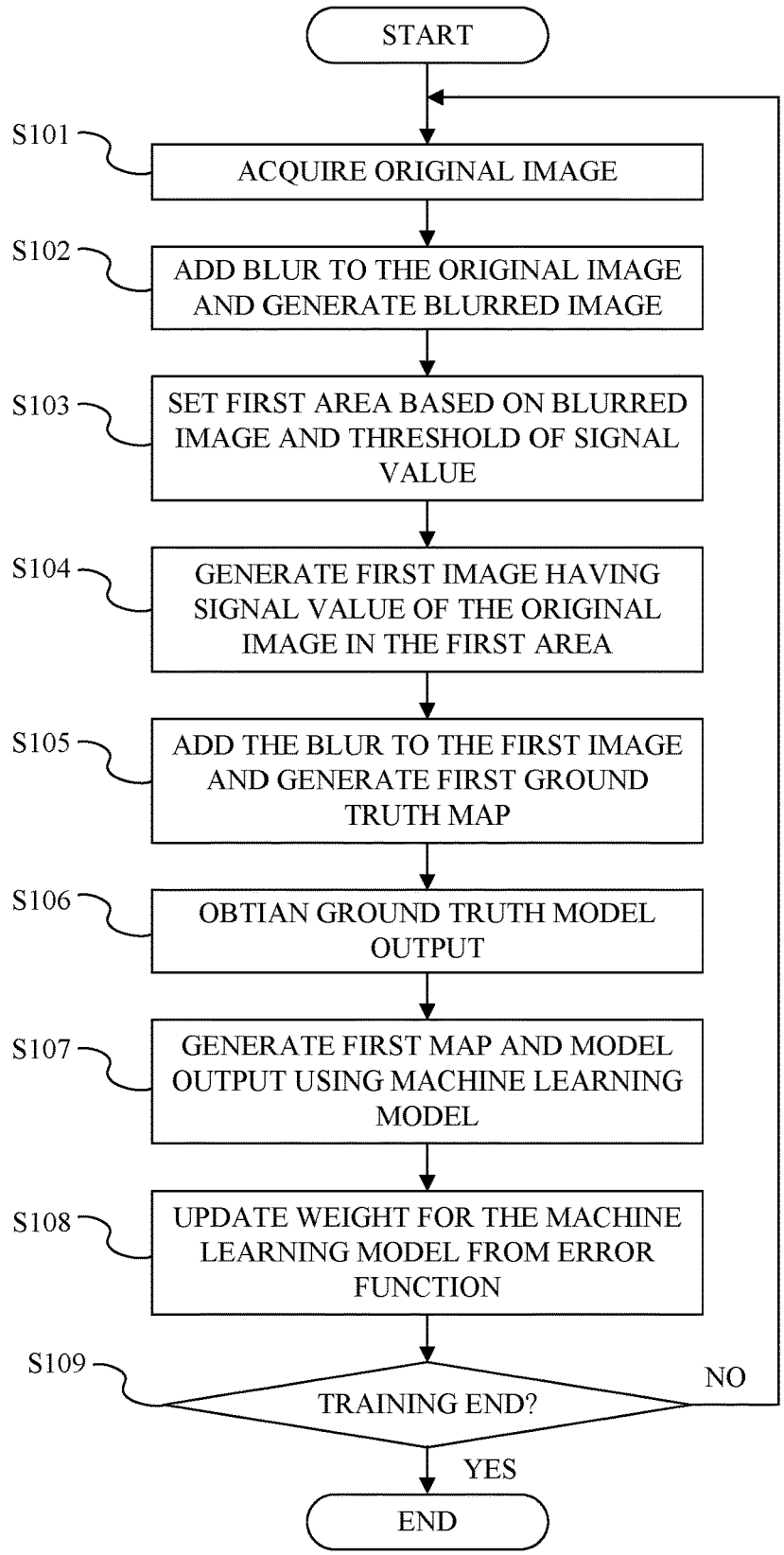
FIG. 6 is a flowchart of training a machine learning model according to the first to third embodiments.

Referring now to FIG. 6, a description will be given of training of the machine learning model executed by the training apparatus 101. FIG. 6 is a flowchart of training of a machine learning model. Each step in FIG. 6 is executed by the memory 101a, the acquisition unit 101b, the calculation unit 101c, or the update unit 101d in the training apparatus 101.

First, in the step S101, the acquisition unit (acquirer) 101b acquires one or more original images from the memory 101a. The original image is an image having a signal value higher than that of a second signal value, where the second signal value is a signal value corresponding to the luminance saturation value of the captured image. Since the signal value may be normalized when it is input to the machine learning model, the second signal value and the luminance saturation value of the captured image do not have to coincide with each other. Since the machine learning model is trained based on the original image, the original image may be an image having various frequency components (edges, gradations, flat portions, etc. with different orientations and intensities). The original image may be a live-action image or CG (Computer Graphics).

Next, in the step S102, the calculation unit (blurring unit) 101c adds a blur to the original image and generates a blurred image. The blurred image is an image input to the machine learning model during training, and corresponds to the captured image during the estimation. The added blur is a blur to be sharpened. This embodiment adds the blur caused by the aberration and diffraction of the optical system 102a and the blur caused by the optical low-pass filter in the image sensor 102b. The shape of the blur caused by the aberration and diffraction of the optical system 102a changes depending on the image plane coordinate (image height and azimuth). It also changes depending on states of a magnification variation, diaphragm (aperture stop), and a focus of the optical system 102a. In an attempt to comprehensively train the machine learning model so as to sharpen all of these blurs, a plurality of blurred images may be generated with a plurality of blurs generated by the optical system 102a. In the blurred image, the signal value beyond the second signal value is clipped so as to reproduce the luminance saturation that occurs in the imaging process of the captured image. If necessary, noise generated by the image sensor 102b may be added to the blurred image.

Next, in the step S103, the calculation unit (setting unit) 101c sets the first area using the image and the threshold of the signal value based on the original image. This embodiment uses a blurred image as the image based on the original image, but may use the original image itself. The first area is set by comparing the signal value of the blurred image and the threshold of the signal value with each other. More specifically, an area where the signal value of the blurred image is equal to or higher than the threshold of the signal value is set to the first area. This embodiment sets the threshold of the signal value to the second signal value. Therefore, the first area represents the luminance saturation area in the blurred image. However, the threshold of the signal value and the second signal value do not have to coincide with each other. The threshold of the signal value may be set to a value slightly smaller than the second signal value (such as 0.9 times).

Next, in the step S104, the calculation unit (image generating unit) 101c generates a first image having the signal value of the original image in the first area. The first image has a signal value different from that of the original image in an area other than the first area. The first image may have a first signal value in an area other than the first area. In this embodiment, the first signal value is, but not limited to, 0. In this embodiment, the first image has the signal value of the original image only in the luminance saturation area in the blurred image, and a signal value of 0 in the other areas.

Next, in the step S105, the calculation unit (map generating unit) 101c adds the blur to the first image and generates the first ground truth map. The added blur is the same as the blur added to the blurred image. Thereby, the first ground truth map is generated, which is a map (spatial arranged signal sequence) representing the magnitude and range of the signal values leaked to the periphery due to the blur, from the object in the luminance saturation area in the blurred image. This embodiment clips the first ground truth map with the second signal value similar to the blurred image, but may perform no clipping.

Next, in the step S106, the acquisition unit 101b acquires the ground truth model output. In this embodiment, the task is sharpening the blur, so the ground truth model output is an image with less blurred than the blurred image. This embodiment generates the ground truth model output by clipping the original image with the second signal value. If the original image lacks high frequency components, an image made by reducing the original image may be used as the ground truth model output. In this case, the reduction is similarly performed when the blurred image is generated in the step S102. The step S106 may be executed at any time as long as it is after the step S101 and before the step S107.

Next, in the step S107, the calculation unit 101c generates a first map and a model output based on the blurred image using the machine learning model. FIG. 1 is a block diagram of a machine learning model. This embodiment uses, but is not limited to, the machine learning model illustrated in FIG. 1. In FIG. 1, a blurred image 201 and a luminance saturation map 202 are input to the machine learning model. The luminance saturation map 202 is a map (second map) representing an area where the luminance of the blurred image 201 is saturated (where the signal value is equal to or higher than the second signal value). For example, it can be generated by binarizing the blurred image 201 with the second signal value. However, it is not necessary to use the luminance saturation map 202. The blurred image 201 and the luminance saturation map 202 are connected in the channel direction and input to the machine learning model, but this embodiment is not limited to this example. For example, the blurred image 201 and the luminance saturation map 202 may be converted into feature maps, and these feature maps may be connected in the channel direction. Information other than the luminance saturation map 202 may be added to the input.

The machine learning model has multiple layers, and the linear sum of an input of the layer and a weight is calculated in each layer. The initial value of the weight can be determined by a random number or the like. This embodiment uses, as a machine learning model, a CNN that uses a convolution of an input and a filter as a linear sum (the value of each element of the filter corresponds to a weight and may include a sum with a bias) but is not limited to this example. In each layer, a nonlinear conversion is executed by an activation function such as a ReLU (Rectified Linear Unit) or a sigmoid function as needed. The machine learning model may have a residual block or a Skip Connection (also referred to as a Shortcut Connection), if necessary. A first map 203 is generated via multiple layers (sixteen convolutional layers in this embodiment). This embodiment generates the first map 203 by summing up the output of the layer 211 and each element of the luminance saturation map 202, but the configuration is not limited to this example. The first map may be generated directly as the output of layer 211. Alternatively, the result of performing arbitrary processing on the output of the layer 211 may be used as the first map 203.

Next, the first map 203 and the blurred image 201 are connected in the channel direction and input to the subsequent layers, and generate the model output 204 through a plurality of layers (sixteen convolutional layers in this embodiment). The model output 204 is also generated by summing up the output of the layer 212 and each element of the blurred image 201, but is not limited to this example. This embodiment performs convolutions with 64 types of 3×3 filters in each layer (where the number of filter types is the same as the number of channels of the blurred image 201 in the layers 211 and 212), but the convolution is limited to this example.

Next, in the step S108 of FIG. 6, the update unit (training unit) 101d updates the weight for the machine learning model based on the error function. In this embodiment, the error function is a weighted sum of an error between the first map 203 and the first ground truth map and an error between the model output 204 and the ground truth model output. MSE (Mean Squared Error) is used to calculate the error. The weight is 1 for both of them. The error functions and weights are not limited to these examples. An error back-propagation method (Backpropagation) or the like can be used to update the weight. The error may be calculated with the residual component. In using the residual component, an error between a difference component between the first map 203 and the luminance saturation map 202 and a difference component between the first ground truth map and the luminance saturation map 202 is used. Similarly, an error between a difference component between the model output 204 and the blurred image 201 and a difference component between the ground truth model output and the blurred image 201 is used.

Next, in the step S109, the update unit 101d determines whether or not the training of the machine learning model is completed. The completion of training can be determined based on whether the number of weight updating repetitions has reached a predetermined number, whether a weight changing amount during an update is smaller than a default value, and the like. If it is determined in the step S109 that the training has not yet been completed, the flow returns to the step S101, and the acquisition unit 101b acquires one or more new original images. On the other hand, when it is determined that the training has been completed, the update unit 101d ends the training and stores the configuration and weight information of the machine learning model in the memory 101a.

The above training method enables the machine learning model to estimate the first map that represents the magnitude and range of the signal value in which the object in the luminance saturation area in the blurred image (captured image in the estimation) is spread by the blur. By explicitly estimating the first map, the machine learning model can sharpen a blur for each of the saturated and unsaturated blurred images in a proper area, thus suppressing the artifact.

Figure 7:
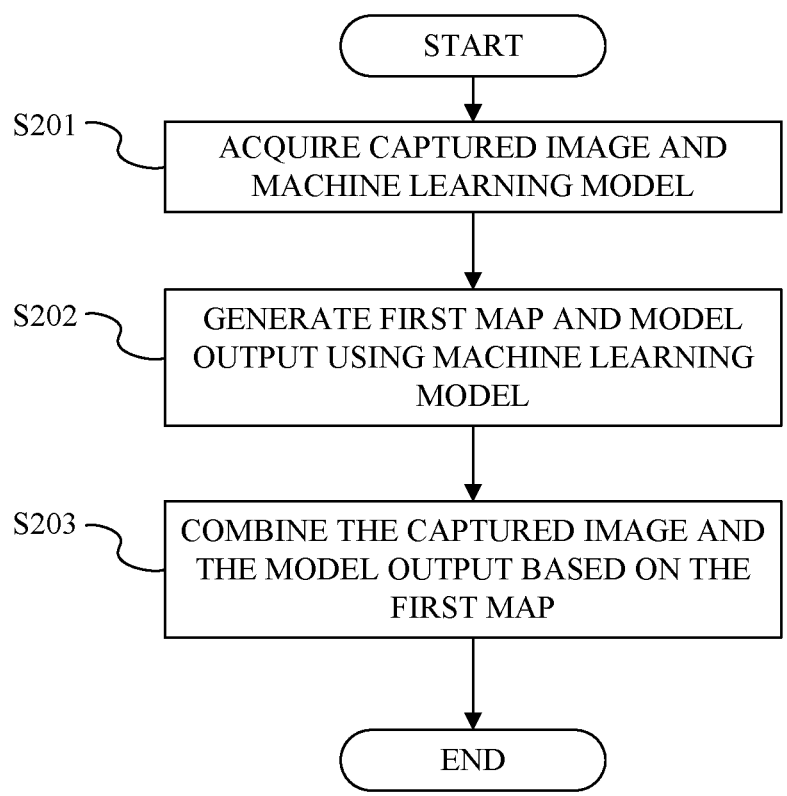
FIG. 7 is a flowchart of generating a model output according to the first and second embodiments.

Referring now to FIG. 7, a description will be given of sharpening a blur in a captured image using the trained machine learning model executed by the image processing apparatus 103. FIG. 7 is a flowchart of generating a model output. Each step in FIG. 7 is executed by the memory 103a, the acquisition unit 103b, or the sharpening unit 103c in the image processing apparatus 103.

First, in the step S201, the acquisition unit (acquirer) 103b acquires the captured image and the machine learning model. Information on the structure and weight of the machine learning model is acquired from the memory 103a.

Next, in the step S202, the sharpening unit (generating unit) 103c generates a first map from the captured image and a blur-sharpened image (model output) in which the blur in the captured image is sharpened, using the machine learning model. The machine learning model has the configuration illustrated in FIG. 1, as in that for the training. Similar to the training, the luminance saturation map representing the luminance saturation area in the captured image is generated and input, and the first map and the model output are generated.

Next, in the step S203, the sharpening unit 103c combines the captured image and the model output based on the first map. The object information is attenuated by the luminance saturation around the luminance saturation area in the captured image, unlike other areas, so that it is difficult to sharpen the blur (estimate the attenuated object information). Therefore, harmful effects (ringing, undershoot, etc.) along with blur sharpening are likely to occur around the luminance saturation area. In order to suppress this adverse effect, the model output and the captured image are combined. At this time, combining them based on the first map can increase the weight of the captured image only around the luminance saturated area where the adverse effect is likely to occur, while suppressing the decrease in the blur sharpening effect in the unsaturated blurred image. This embodiment provides a combination in the following way. The first map is normalized by the second signal value, used as a weight map for the captured image, and weight-averaged with the model output. A weight map obtained by subtracting the weight map for the captured image from a map of all 1 is used for the model output. By changing the signal value that normalizes the first map, a balance between the blur sharpening effect and the harmful effect can be adjusted. A combining method may be used that replaces the model output with the captured image only in an area where the first map has a value equal to or higher than a predetermined signal value.

The above configuration can provide an image processing system that can suppress the deterioration of the accuracy caused by the luminance saturation in sharpening a blur using the machine learning model.

Second Embodiment

A description will now be given of an image processing system according to a second embodiment of the present invention. In this embodiment, a task by the machine learning model is converting a blurring effect (bokeh) for the captured image including the luminance saturation. The conversion of the blurring effect is a task of converting the defocus blur acting on the captured image into a blur having a shape different from that of the defocus blur. For example, when the defocus blur has a double line blur or vignetting, it is converted into a circular disc (a shape with a flat intensity) or a Gaussian blur. In the conversion of the blurring effect, the defocus blur is made larger, and no blur sharpening (estimation of attenuated object information) is performed. The method described in this embodiment can obtain the same effect in a task other than the task of converting the blurring effect.

Figure 8:
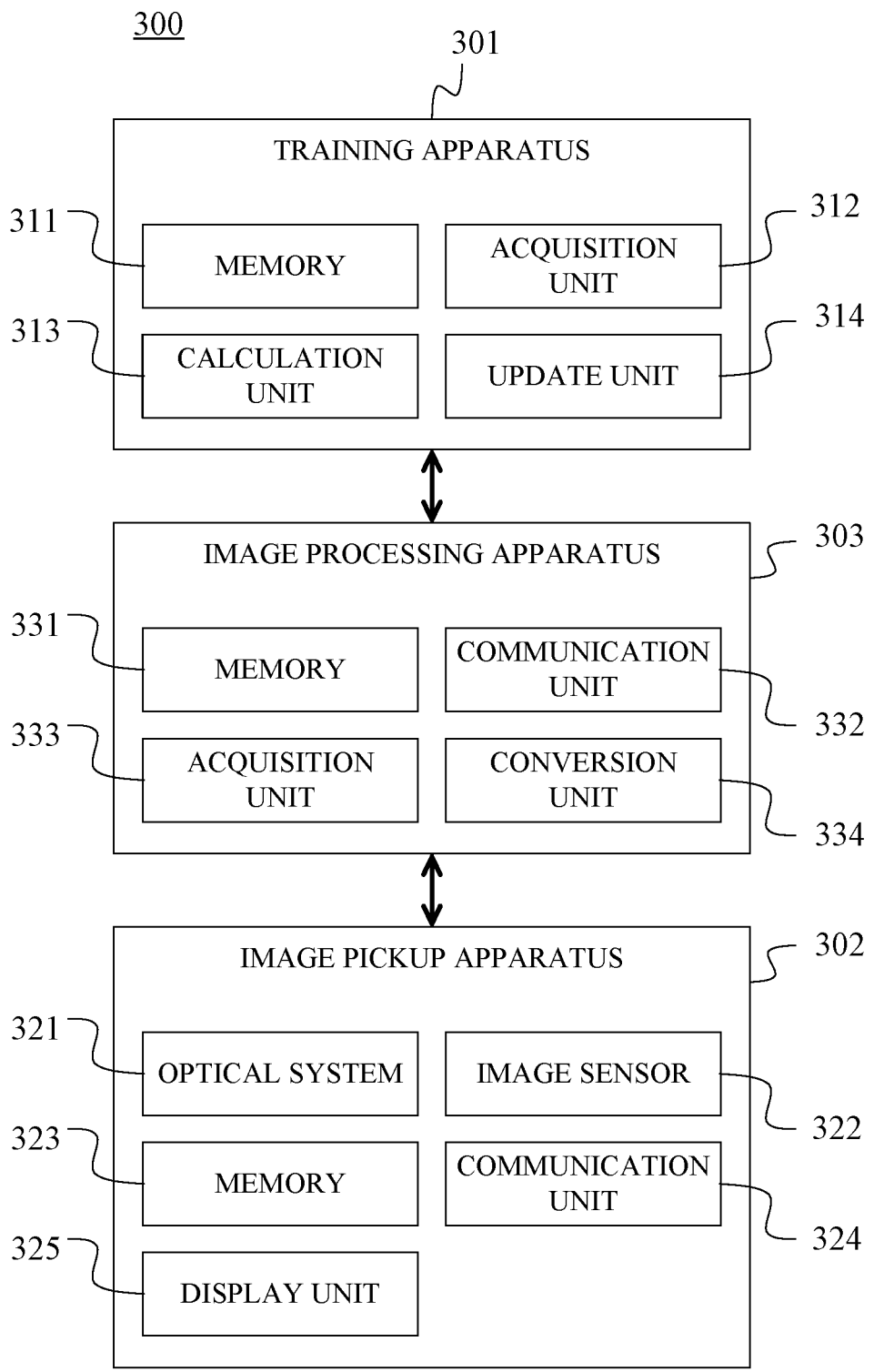
FIG. 8 is a block diagram of an image processing system according to the second embodiment.
Figure 9:
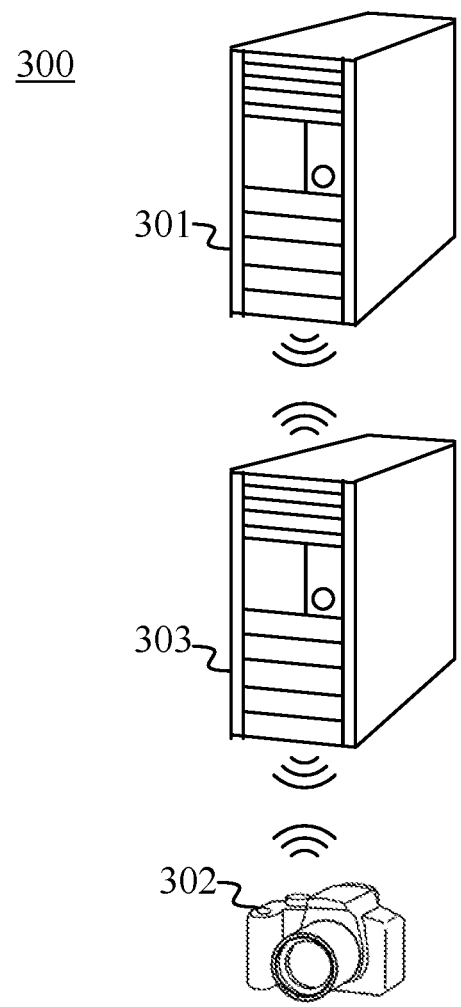
FIG. 9 is an external view of the image processing system according to the second embodiment.

FIG. 8 is a block diagram of an image processing system 300 according to this embodiment. FIG. 9 is an external view of the image processing system 300. The image processing system 300 includes a training apparatus 301, an image pickup apparatus 302, and an image processing apparatus 303. The training apparatus 301 and the image processing apparatus 303, and the image processing apparatus 303 and the image pickup apparatus 302 are connected to each other by a wired or wireless network, respectively. The training apparatus 301 includes a memory 311, an acquisition unit 312, a calculation unit 313, and an update unit 314. The image pickup apparatus 302 includes an optical system 321, an image sensor 322, a memory 323, a communication unit 324, and a display apparatus 325. The image processing apparatus 303 includes a memory 331, a communication unit 332, an acquisition unit 333, and a conversion unit 334.

A captured image captured by the image pickup apparatus 302 is affected by a defocus blur of a shape corresponding to the optical system 321. The captured image is transmitted to the image processing apparatus 303 via the communication unit (transmitter) 324. The image processing apparatus 303 receives the captured image via the communication unit (receiver) 332, and converts the blur effect by using the configuration and the weight information of the machine learning model stored in the memory 331. The configuration and weight information of the machine learning model is trained by the training apparatus 301, previously acquired from the training apparatus 301, and stored in the memory 331. A blur-converted image (model output) in which the blurring effect in the captured image is converted is transmitted to the image pickup apparatus 302, stored in the memory 323, and displayed on the display unit 325.

Referring now to FIG. 6, a description will be given of training of the machine learning model executed by the training apparatus 301. A description of matters common to the first embodiment will be omitted.

First, in the step S101, the acquisition unit 312 acquires one or more original images from the memory 311. Next, in the step S102, the calculation unit 313 sets a defocus amount for the original image, and generates a blurred image in which the defocus blur corresponding to the defocus amount is added to the original image. A shape of the defocus blur changes depending on the magnification variation and diaphragm of the optical system 321. The defocus blur also changes depending on the focal length of the optical system 321 and the defocus amount of the object at that time. The defocus blur also changes depending on the image height and azimuth. In an attempt to comprehensively train the machine learning model that can convert all of these defocus blurs, a plurality of blurred images may be generated by using a plurality of defocus blurs generated in the optical system 321. In the conversion of the blurring effect, the focused object that is not defocused may be maintained before and after the conversion. Since it is necessary to train the machine learning model so as to maintain the focused object, a blurred image with a defocus amount of 0 is also generated. The blurred image with a defocus amount of 0 may not be blurred, or may be blurred by the aberration or diffraction on the focal plane of the optical system 321.

Next, in the step S103, the calculation unit 313 sets the first area based on the blurred image and the threshold of the signal value. Next, in the step S104, the calculation unit 313 generates a first image having the signal value of the original image in the first area. Next, in the step S105, the calculation unit 313 adds the same defocus blur as that in the blurred image to the first image, and generates the first ground truth map. Next, in the step S106, the acquisition unit 312 acquires the ground truth model output. This embodiment trains the machine learning model so as to convert the defocus blur into a disc blur (blur having a circular and flat intensity distribution). Therefore, a disc blur is added to the original image to generate a ground truth model output. However, the shape of the blur to be added is not limited to this example. A disc blur with a spread corresponding to the defocus amount of the blurred image is added. The added disc blur is more blurred than the defocus blur added in the generation of the blurred image. In other words, the disc blur has an MTF (modulation transfer function) lower than that of the defocus blur added in the generation of the blurred image. When the defocus amount is 0, it is the same as the generation of the blurred image.

Figure 10:
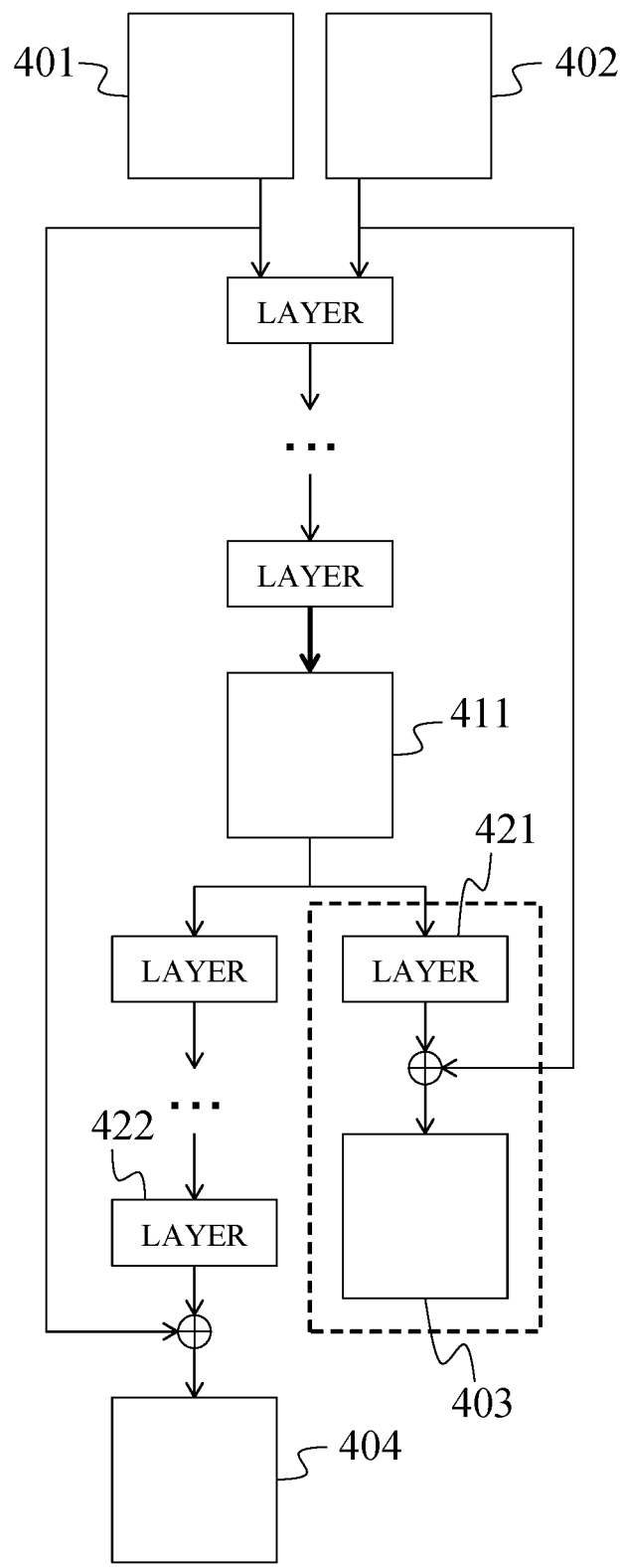
FIG. 10 is a configuration diagram of a machine learning model according to the second embodiment.

Next, in the step S107, the calculation unit 313 generates the first map and model output from the blurred image using the machine learning model. FIG. 10 is a block diagram of the machine learning model according to this embodiment. This embodiment uses the machine learning model having the configuration illustrated in FIG. 10, but the present invention is not limited to this embodiment. In FIG. 10, a blurred image 401, and a luminance saturation map (second map) 402 representing a luminance saturation area in the blurred image 401 are connected to each other in the channel direction and input, and the first feature map 411 is generated via a plurality of layers (nineteen convolution layers). A first map 403 and a model output 404 are generated based on the first feature map. This embodiment branches the layers in the middle of the machine learning model, and inputs the first feature map 411 to each branch. The first map 403 is generated from the first feature map 411 via one layer (one convolutional layer), and the model output 404 is generated through a plurality of layers (twenty convolutional layers) but the number of layers is not limited to this embodiment. The layer may not be branched, and the first map 403 and the model output 404 may be generated from the first feature map 411 while they are connected to each other in the channel direction.

The configuration of FIG. 10 does not directly use the first map 403 to generate the model output 404. However, the first feature map 411, which is the source for generating the first map 403, contains information for separating separate the area affected by the luminance saturation and the other area from each other. By generating the model output 404 based on the first feature map 411, the same effect as the configuration of FIG. 1 can be obtained. This embodiment performs convolutions with 32 types of 3×3 filters in each layer (where the number of filter types in layers 421 and 422 is the same as the number of channels of the blurred image 401), but the configuration is not limited to this embodiment.

The number of linear sums (convolutions in this embodiment) executed until the first map 403 is generated from the blurred image 401 may be equal to or less than the number of linear sums executed until the model output 404 is generated from the blurred image 401. This is to enable the first feature map 411 to be generated in the middle of the model that has information for separating the area affected by luminance saturation and the other area from each other, and the desired task (of converting the blurring effect in this embodiment) to be performed in the subsequent model. In this embodiment, the number of linear sums executed until the first feature map 411 is generated from the blurred image 401 is common, and the difference is the number of subsequent linear sums. Since the first map 403 and the model output 404 are generated from the first feature map 411 via one layer and twenty layers, respectively, the number of linear sums executed until the first map 403 is generated is less. This is similar to the estimation (the blurred image 401 can be replaced with the captured image).

Next, in the step S108, the update unit 314 updates the weight for the machine learning model from the error function. Next, in the step S109, the update unit 314 determines whether or not the training of the machine learning model is completed. Information on the configuration and weight of the trained machine learning model is stored in the memory 311.

Referring now to FIG. 7 a description will be given of the conversion of the blurring effect in the captured image using the trained machine learning model, which is executed by the image processing apparatus 303. A description of matters common to the first embodiment will be omitted.

First, in the step S201, the acquisition unit 333 acquires the captured image and the machine learning model. Next, in the step S202, using a machine learning model, the conversion unit 334 generates the first map and the blur-converted image (model output) in which the defocus blur of the captured image is converted into a blur having a different shape. The machine learning model has the same configuration as that illustrated in FIG. 10 similar to the training. Similar to the training, the luminance saturation map representing the luminance saturation area in the captured image is generated and input, and the first map and the model output are generated. Next, in the step S203, the conversion unit 334 combines the captured image and the model output based on the first map. If the step S203 is not executed (if the model output of the step S202 is used as the final blur-converted image), the first map is unnecessary. In this case, it is unnecessary to execute a portion surrounded by a broken line in FIG. 10. Therefore, the calculation of the portion surrounded by the broken line may be omitted and a processing load is reduced.

The above configuration can provide an image processing system that can suppress a decrease in accuracy caused by the luminance saturation in the conversion of the blurring effect using the machine learning model.

Third Embodiment

A description will now be given of an image processing system according to the third embodiment of the present invention. In this embodiment, a task using the machine learning model is an estimation of the depth map for the captured image. Since the blur shape changes depending on the defocus amount in the optical system, the blur shape and the depth (defocus amount) can be associated with each other. The machine learning model can generate a depth map of the object space by estimating the blur shape in each area of the input captured image in the model (explicitly or implicitly). The method described in this embodiment can obtain the same effect in a task other than the estimation of the depth map.

Figure 11:
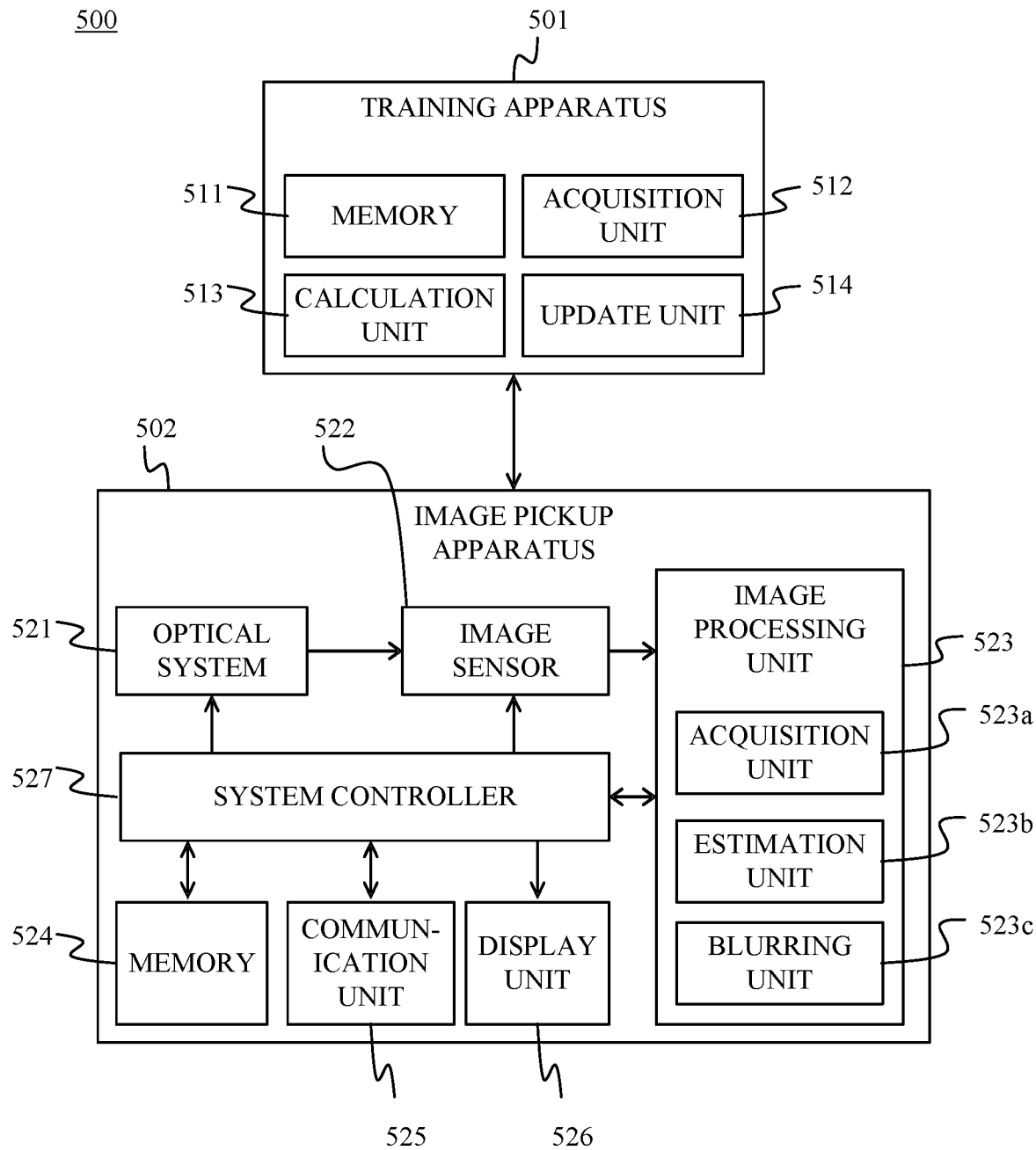
FIG. 11 is a block diagram of an image processing system according to the third embodiment.
Figure 12:
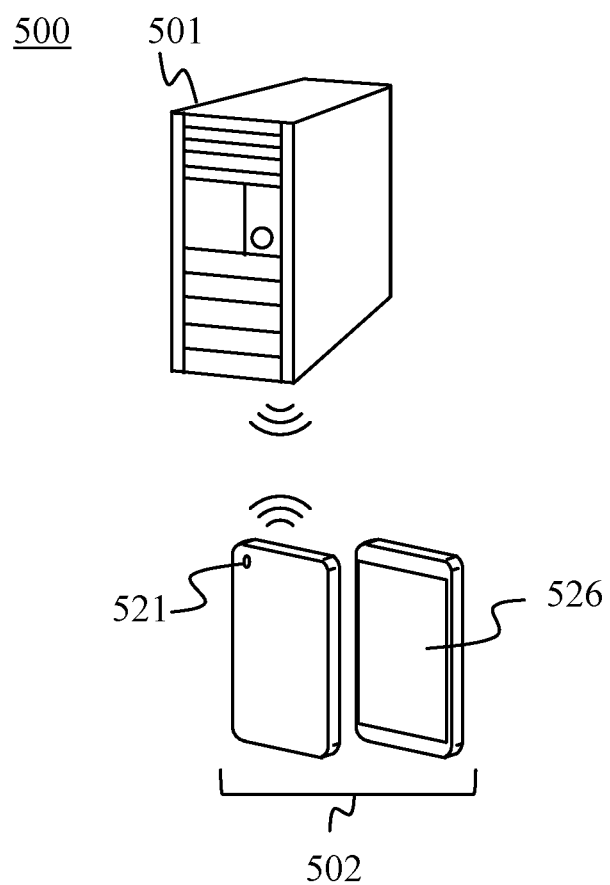
FIG. 12 is an external view of the image processing system according to the third embodiment.

FIG. 11 is a block diagram of an image processing system 500 in this embodiment. FIG. 12 is an external view of the image processing system 500. The image processing system 500 includes a training apparatus 501 and an image pickup apparatus 502 connected to each other by a wire or wirelessly. The training apparatus 501 includes a memory 511, an acquisition unit 512, a calculation unit 513, and an update unit 514. The image pickup apparatus 502 includes an optical system 521, an image sensor 522, an image processing unit 523, a memory 524, a communication unit 525, a display unit 526, and a system controller 527. The image processing unit 523 includes an acquisition unit 523a, an estimation unit 523b, and a blurring unit 523c.

The image pickup apparatus 502 forms an image of the object space via the optical system 521, and the image sensor 522 acquires the image as a captured image. The captured image is blurred by the aberration and defocus of the optical system 521. The image processing unit 523 generates a depth map of the object space from the captured image using the machine learning model. The machine learning model is trained by the training apparatus 501, and the configuration and weight information is previously acquired from the training apparatus 501 via the communication unit 525 and stored in the memory 524. The captured image and the estimated depth map are stored in the memory 524 and displayed on the display unit 526 as needed. The depth map is used to add a blurring effect to the captured image and cut out an object. A series of controls are performed by the system controller 527.

Referring now to FIG. 6, a description will be given of training of the machine learning model executed by the training apparatus 501. A description of matters common to the first embodiment will be omitted.

First, in the step S101, the acquisition unit 512 acquires one or more original images. Next, in the step S102, the calculation unit 513 adds a blur to the original image and generates a blurred image. A depth map (which may be a defocus map) corresponding to the original image and a focal length of the optical system 521 are set, and a blur corresponding to the focal length of the optical system 521 and the defocus amount from the optical system 521 is added. When an F-number (aperture value) is fixed, the larger the absolute value of the defocus amount becomes, the greater the defocus blur becomes. Due to the influence of the spherical aberration, the blur shape changes before and after the focal plane. When the spherical aberration is generated in the negative direction, it causes a double line blur in a direction away from the optical system 521 from the focal plane (on the object side) in the object space, and a blur has a shape with a peak at the center in the approaching direction (on the image side). If the spherical aberration is positive, the relationship becomes reversed. The shape of the blur further changes according to the defocus amount due to the influence of the astigmatism or the like off the optical axis.

Next, in the step S103, the calculation unit 513 sets the first area based on the blurred image and the threshold of the signal. Next, in the step S104, the calculation unit 513 generates a first image having the signal value of the original image in the first area. Next, in the step S105, the calculation unit 513 adds a blur to the first image and generates a first ground truth map. In this embodiment, the first ground truth map is not clipped by the second signal value. This trains the machine learning model to estimate the pre-clip luminance of the luminance saturation area in the generation of the first map. Next, in the step S106, the acquisition unit 512 acquires the ground truth model output. The ground truth model output is the depth map set in the step S102.

Figure 13:
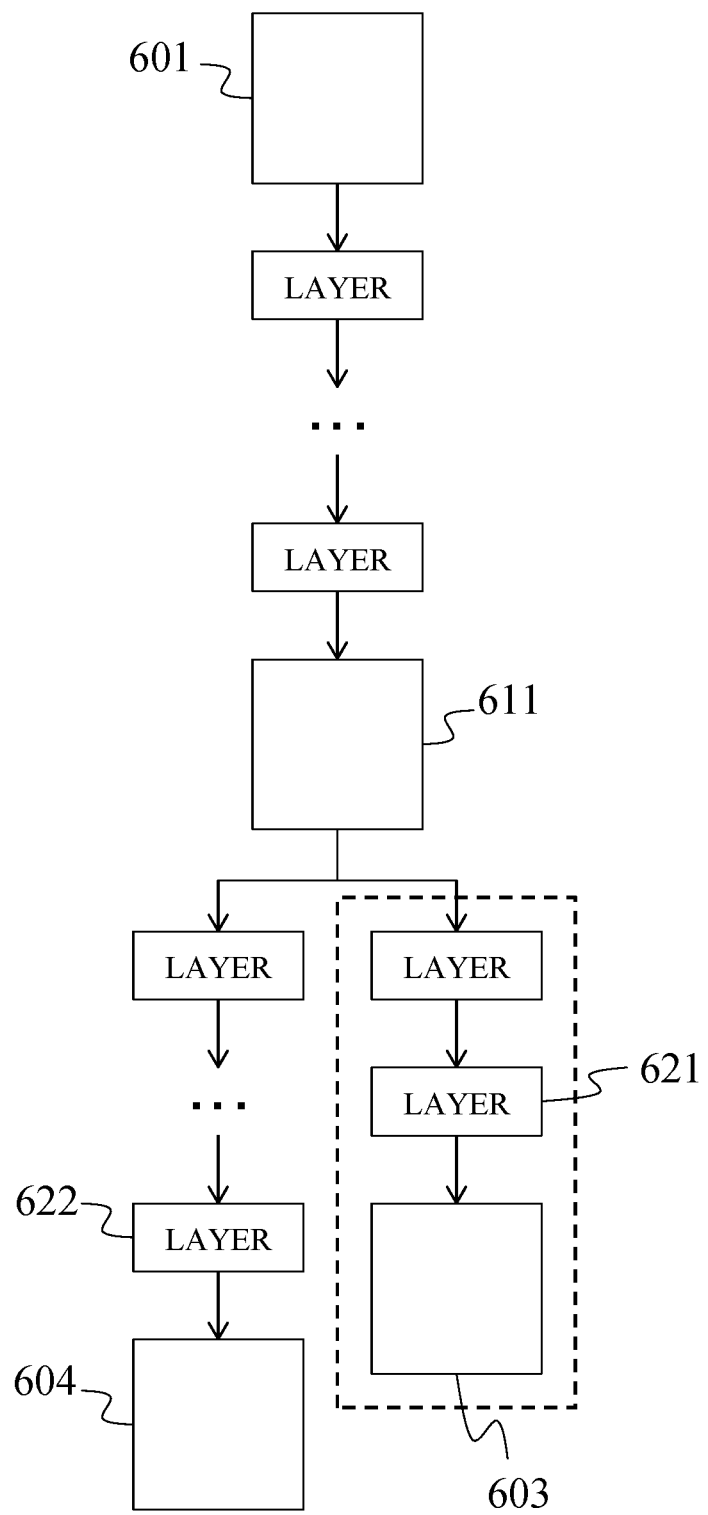
FIG. 13 is a configuration diagram of a machine learning model according to the third embodiment.

Next, in the step S107, the calculation unit 513 generates the first ground truth map and the model output using the machine learning model. The machine learning model uses the configuration of FIG. 13. FIG. 13 is a block diagram of the machine learning model according to this embodiment. A first feature map 611 is generated from a blurred image 601 via a plurality of layers (ten convolution layers in this embodiment), and a first map 603 and a model output 604 are generated based on the first feature map 611. The first map 603 is generated from the first feature map 611 via a plurality of layers (two convolution layers), and the model output 604 is generated from the first feature map 611 via a plurality of layers (twenty convolution layers). This embodiment performs convolutions with 48 types of 5×5 filters in each layer (where the number of filter types in a layer 621 is the same as the number of channels in the blurred image 601 and the number of filters in a layer 622 is 1), but is not limited to this example.

Next, in the step S108, the update unit 514 updates the weight for the machine learning model using the error function. Next, in the step S109, the update unit 514 determines whether or not the training of the machine learning model is completed.

Figure 14:
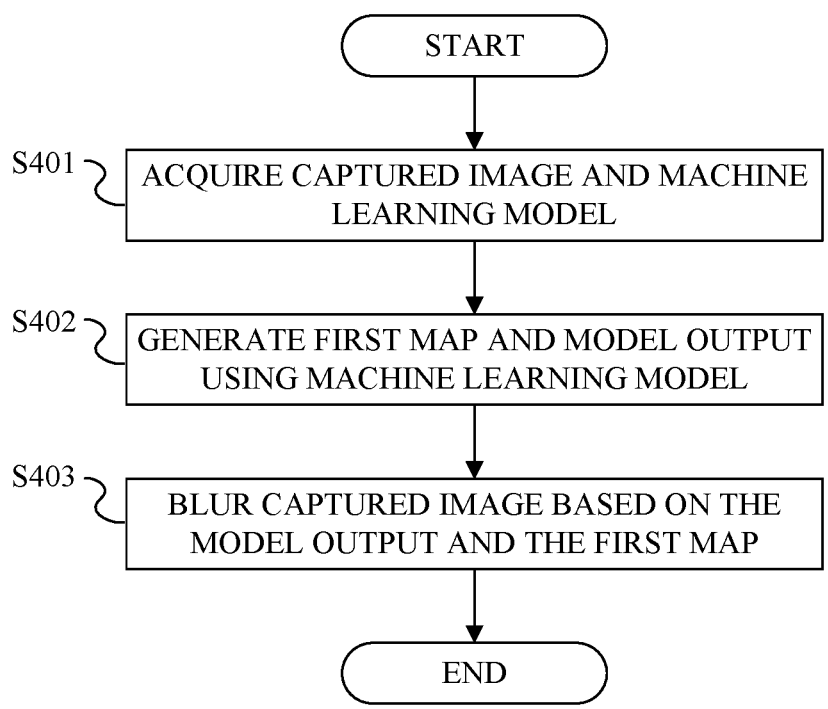
FIG. 14 is a flowchart of generating a model output according to the third embodiment.

Referring now to FIG. 14, a description will be given of an estimation of a depth map of a captured image using a machine learning model and an addition of a blur to the captured image, which are executed by the image processing unit 523. FIG. 14 is a flowchart of generating the model output according to this embodiment. A description of matters common to the first embodiment will be omitted.

First, in the step S401, the acquisition unit 523a acquires a captured image and a machine learning model. Information on the configuration and weight of the machine learning model is acquired from the memory 524. The machine learning model has the configuration illustrated in FIG. 13. Next, in the step S402, the estimation unit 523b generates a model output (depth map) and a first map from the captured image using the machine learning model.

Next, in the step S403, the blurring unit 523c adds a blur to the captured image based on the model output and the first map, and generates a blurred image (with a shallow depth of field). The blur is set from the depth map as the model output according to the defocus amount for each area of the captured image. No blur is added to the in-focus area, and a larger blur is added to an area with a larger defocus amount. In the first map, the pre-clip luminance in the luminance saturation area in the captured image is estimated. After a signal value in the luminance saturation area in the captured image is replaced with this luminance, the blur is added. Thereby, an image with a natural blurring effect can be generated in which sunbeams, reflected light on a water surface, and light of the night view are not darkened by the added blur.

The above configuration can provide an image processing system that can suppress a decrease in accuracy caused by the luminance saturation in the estimation of the depth map using the machine learning model.

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image processing method and apparatus, a method and apparatus of training a machine learning model, and a storage medium, each of which can suppress a decrease in accuracy caused by the luminance saturation in a recognition or regression task using a machine learning model for a blurred captured image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, an image processing system may include the image processing apparatus (first apparatus) according to each embodiment and a device on the cloud (second apparatus) that are communicable with each other, wherein the second apparatus executes the processing in FIG. 7 or 14 according to a request from the first apparatus. In this case, the first apparatus includes a transmitter configured to transmit a captured image and a processing request to the second apparatus. The second apparatus includes a receiver configured to receive the captured image and the request from the first apparatus, and a generator configured to generate the first map based on the captured image using the machine learning model in accordance with the received request.

This application claims the benefit of Japanese Patent Application No. 2021-018697, filed on Feb. 9, 2021, which is hereby incorporated by reference herein in its entirety.

What is claimed is:
1. An image processing method comprising:
a first step of acquiring a captured image; and a second step of generating a first map based on the captured image using a machine learning model, wherein the first map is a map indicating a magnitude and range of a signal value in an area where an object in a luminance saturation area in the captured image is spread by a blur generated in an imaging step of the captured image, and wherein the machine learning model generates the first map based on the captured image and a second map representing the luminance saturation area of the captured image.

2. A non-transitory computer-readable storage medium storing a program that causes a computer to execute an image processing method according to claim 1.

3. An image processing method comprising:

a first step of acquiring a captured image;

a second step of generating a first map based on the captured image using a machine learning model; and a third step of generating a model output based on the captured image using the machine learning model, wherein the first map is a map indicating a magnitude and range of a signal value in an area where an object in a luminance saturation area in the captured image is spread by a blur generated in an imaging step of the captured image, and wherein the model output is a recognition label or a spatially arranged signal sequence corresponding to the captured image.

4. The image processing method according to claim 3, wherein the model output includes an image in which the blur of the captured image is sharpened, an image in which the blur of the captured image is converted into a blur having a different shape, or a depth map of an object space corresponding to the captured image.

5. The image processing method according to claim 3, wherein the third step generates the model output based on the first map.

6. The image processing method according to claim 3, wherein the third step generates a first feature map based on the captured image using the machine learning model, and generates the first map and the model output based on the first feature map.

7. The image processing method according to claim 3, wherein the number of linear sums executed up to a generation of the first map from the captured image is equal to or less than the number of linear sums executed up to a generation of the model output from the captured image.

8. The image processing method according to claim 3, wherein the model output is an image corresponding to the captured image, and wherein the image processing method further comprises a fourth step of generating an image in which the captured image and the model output are combined based on the first map.

9. A non-transitory computer-readable storage medium storing a program that causes a computer to execute an image processing method according to claim 3.

10. An image processing apparatus comprising at least one processor or circuit configured to execute a plurality of tasks including:

an acquiring task configured to acquire a captured image; and a generating task configured to generate a first map based on the captured image using a machine learning model, wherein the first map is a map indicating a magnitude and range of a signal value in an area where an object in a luminance saturation area in the captured image is spread by a blur generated in an imaging step of the captured image, and wherein the machine learning model generates the first map based on the captured image and a second map representing the luminance saturation area of the captured image.

11. An image processing system comprising:

an image processing apparatus; and a system controller is communicable with the image processing apparatus, wherein the image processing apparatus includes at least one processor or circuit configured to execute a plurality of tasks including:

an acquiring task configured to acquire a captured image; and a generating task configured to generate a first map based on the captured image using a machine learning model, wherein the first map is a map indicating a magnitude and range of a signal value in an area where an object in a luminance saturation area in the captured image is spread by a blur generated in an imaging step of the captured image, wherein the system controller sends a request to perform processing on the captured image, and wherein the image processing apparatus performs processing on the captured image based on the request.

12. An image processing apparatus comprising at least one processor or circuit configured to execute a plurality of tasks including:

an acquiring task configured to acquire a captured image, a first generating task configured to generate a first map based on the captured image using a machine learning model; and, a second generating task configured to generate a model output based on the captured image using the machine learning model, wherein the first map is a map indicating a magnitude and range of a signal value in an area where an object in a luminance saturation area in the captured image is spread by a blur generated in an imaging step of the captured image, and wherein the model output is a recognition label or a spatially arranged signal sequence corresponding to the captured image.

* * * * *